(12) United States Patent
Chen et al.

(10) Patent No.: US 11,516,956 B2
(45) Date of Patent: Dec. 6, 2022

(54) METHOD FOR MAIZE CULTIVATION IN BLACK SOIL AREA OF NORTHEAST CHINA

(71) Applicants: Northeast Institute of Geography and Agroecology, Chinese Academy of Sciences, Changchun (CN); Jilin Qianyi Modern Agriculture Co., Ltd., Changchun (CN)

(72) Inventors: Xuewen Chen, Changchun (CN); Aizhen Liang, Changchun (CN); Guochen Xu, Changchun (CN); Hao Guo, Changchun (CN); Yan Zhang, Changchun (CN)

(73) Assignees: NORTHEAST INSTITUTE OF GEOGRAPHY AND AGROECOLOGY, Changchun (CN); JILIN QIANYI MODERN AGRICULTURE CO., LTD., Changchun (CN)

(*) Notice: Subject to any disclaimer, the term of this patent is extended or adjusted under 35 U.S.C. 154(b) by 35 days.

(21) Appl. No.: 17/244,888

(22) Filed: Apr. 29, 2021

(65) Prior Publication Data
US 2022/0124968 A1    Apr. 28, 2022

(30) Foreign Application Priority Data
Oct. 23, 2020    (CN) .......................... 202011147377.1

(51) Int. Cl.
*A01B 79/02* (2006.01)
*A01C 21/00* (2006.01)
(Continued)

(52) U.S. Cl.
CPC .............. *A01B 79/02* (2013.01); *A01B 79/00* (2013.01); *A01C 21/005* (2013.01); *A01N 25/04* (2013.01); *C05D 1/00* (2013.01); *C05F 11/08* (2013.01)

(58) Field of Classification Search
CPC ....... A01C 21/005; A01C 21/00; A01B 79/02; A01B 70/00
See application file for complete search history.

(56) References Cited

PUBLICATIONS

Zhang et al.; The potential mechanism of long-term conservation tillage effects on maize yield in the black soil of Northeast China; Soil & Tillage; 154; 2015; pp. 84-90.*

* cited by examiner

*Primary Examiner* — Kent L Bell
(74) *Attorney, Agent, or Firm* — Grumbles Law PLLC; Brittany Haanan

(57) ABSTRACT

Disclosed is a method for maize cultivation in the black soil area of northeast China, including the following steps that can be conducted in any order: A. conservation tillage with straw returning: after a crop is harvested in autumn, raking and concentrating straws in rows; B. when sowing, disposing a front-loaded returning device on a sowing machine for a second concentration; C. when sowing, increasing the number of plants through a wide- and narrow-row effect; D. additional application of an organic bacterial fertilizer: where, the organic bacterial fertilizer includes a base fertilizer and a seed fertilizer; the base fertilizer refers to 500 kg of a 40% organic-inorganic mixed slow-release fertilizer; the seed fertilizer refers to 80 kg of an organic bacterial fertilizer; E. weeding with a herbicide treated by a secondary dilution method; and F. subsoiling to break a plow pan in summer: subsoiling flat land parcels to 40 cm.

7 Claims, 1 Drawing Sheet

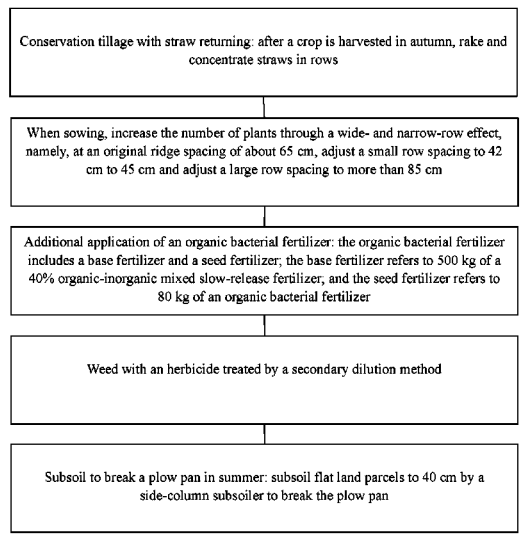

(51) Int. Cl.
*A01N 25/04* (2006.01)
*C05D 1/00* (2006.01)
*C05F 11/08* (2006.01)
*A01B 79/00* (2006.01)

```
┌─────────────────────────────────────────────────────────────────┐
│ Conservation tillage with straw returning: after a crop is      │
│ harvested in autumn, rake and concentrate straws in rows        │
└─────────────────────────────────────────────────────────────────┘
                                │
┌─────────────────────────────────────────────────────────────────┐
│ When sowing, increase the number of plants through a wide- and  │
│ narrow-row effect, namely, at an original ridge spacing of about│
│ 65 cm, adjust a small row spacing to 42 cm to 45 cm and adjust  │
│ a large row spacing to more than 85 cm                          │
└─────────────────────────────────────────────────────────────────┘
                                │
┌─────────────────────────────────────────────────────────────────┐
│ Additional application of an organic bacterial fertilizer: the  │
│ organic bacterial fertilizer includes a base fertilizer and a   │
│ seed fertilizer; the base fertilizer refers to 500 kg of a 40%  │
│ organic-inorganic mixed slow-release fertilizer; and the seed   │
│ fertilizer refers to 80 kg of an organic bacterial fertilizer   │
└─────────────────────────────────────────────────────────────────┘
                                │
┌─────────────────────────────────────────────────────────────────┐
│ Weed with an herbicide treated by a secondary dilution method   │
└─────────────────────────────────────────────────────────────────┘
                                │
┌─────────────────────────────────────────────────────────────────┐
│ Subsoil to break a plow pan in summer: subsoil flat land parcels│
│ to 40 cm by a side-column subsoiler to break the plow pan       │
└─────────────────────────────────────────────────────────────────┘
```

METHOD FOR MAIZE CULTIVATION IN BLACK SOIL AREA OF NORTHEAST CHINA

TECHNICAL FIELD

The present disclosure relates to the field of maize cultivation, and in particular to a method for maize cultivation in the black soil area of Northeast China.

BACKGROUND

As one of the three major food crops in China, maize plays a key role in ensuring the national food security. With the growth of population and the reduction of arable land, fully tapping the potential of maize yield per unit area has become one of the fundamental ways to increase maize yield. As a main constituent of the new agricultural management system, agricultural cooperative plays an important role in the agricultural field, and gradually becomes organizational carrier for the promotion of scale management in the main grain producing areas of Northeast China. However, there are the following problems in the land under the trusteeship of agricultural cooperatives at present: non-standard crop production process and incompletely-tapped land productive potential.

Existing maize cultivation technologies are all single technologies, which fail to achieve the organic integration of agricultural mechanical techniques with agronomic techniques.

SUMMARY

The present disclosure provides a method for maize cultivation in the black soil area of Northeast China, which is intended to solve the problem that existing maize cultivation technologies are all single technologies and fail to achieve the organic integration of agricultural mechanical techniques with agronomic techniques.

The present disclosure is implemented through the following technical solutions.

The present disclosure provides a method for maize cultivation in the black soil area of Northeast China, including the following steps that can be conducted in any order:

A. conservation tillage with straw returning: after a crop is harvested in autumn, raking and concentrating straws in rows;

B. when sowing, increasing the number of plants through a wide- and narrow-row effect;

C. additional application of an organic bacterial fertilizer: where, the organic bacterial fertilizer includes a base fertilizer and a seed fertilizer; the base fertilizer refers to 500 kg of a 40% organic-inorganic mixed slow-release fertilizer; and the seed fertilizer refers to 80 kg of an organic bacterial fertilizer;

D. weeding with a herbicide treated by a secondary dilution method;

E. subsoiling to break a plow pan in summer: subsoiling flat land parcels to 40 cm by a side-column subsoiler to break the plow pan.

Further, increasing the number of plants through a wide- and narrow-row effect in the step B may specifically include: at an original ridge spacing of about 65 cm, adjusting a small row spacing to 42 cm to 45 cm and adjusting a large row spacing to more than 85 cm.

Further, in the step A, when straws are messed up by wind, a front-loaded returning device may be disposed on a sowing machine for a second concentration.

Further, the herbicide in the step D may be diluted by the secondary dilution method, and the herbicide may be prepared into a stock solution with warm water at 30° C. to 40° C.

Further, a temperature of the stock solution may be controlled at 12° C.

Further, the herbicide in the step D is sprayed on stems and leaves of weeds at a 3 to 4-leaf stage of maize.

Further, the herbicide in the step D may be sprayed before 10 AM or after 4 PM.

Further, the weeding in the step D may specifically include pre-emergence weeding and post-emergence weeding.

Further, in the step E, when subsoiling, 280 kg of a nitrogen-potassium fertilizer may be additionally applied at a depth controlled to 30 cm.

Beneficial effects of the present disclosure:

(1) The present disclosure achieves the goals of standardized production, cost reduction, and yield increase of maize cultivation.

(2) Through the three-layer fertilization of the present disclosure, a plant root system is guided into a water-retaining layer, thus improving the ability of drought resistance and flood drainage.

(3) Fertilization is conducted according to the process of the present disclosure, and 80 kg of a high-quality organic bacterial fertilizer is used as a seed fertilizer to ensure that seedlings on no-tillage land parcels show better growth than that on other land parcels.

(4) After the crops are harvested in autumn, straws are timely raked and concentrated in rows to achieve conservation tillage with straw returning.

BRIEF DESCRIPTION OF THE DRAWINGS

To describe the technical solutions in the examples of the present disclosure more clearly, the accompanying drawing required for describing the examples is briefly introduced below. The accompanying drawing in the following description shows merely some examples of the present disclosure, and a person of ordinary skill in the art may still derive other drawings from the accompanying drawing without creative efforts.

FIG. 1 is a flow chart for the method according to the present disclosure.

DETAILED DESCRIPTION

In order to make the objectives, technical solutions, and advantages of the present disclosure more apparent, the present disclosure will be further described in detail below with reference to the examples and accompanying drawing. The exemplary implementations and descriptions thereof in the present disclosure are only used to explain the present disclosure, and are not intended to limit the present disclosure.

Example 1

As shown in FIG. 1, a method for maize cultivation in the black soil area of Northeast China included the following steps that could be conducted in any order:

A. conservation tillage with straw returning: after a crop was harvested in autumn, straws were raked and concentrated in rows;

B. when sowing, the number of plants was increased through a wide- and narrow-row effect, where, at an original ridge spacing of about 65 cm, a small row spacing was adjusted to 42 cm to 45 cm and a large row spacing was adjusted to more than 85 cm;

C. additional application of an organic bacterial fertilizer: the organic bacterial fertilizer included a base fertilizer and a seed fertilizer; the base fertilizer referred to 500 kg of a 40% organic-inorganic mixed slow-release fertilizer; and the seed fertilizer referred to 80 kg of an organic bacterial fertilizer;

D. weeding was conducted with a herbicide treated by a secondary dilution method; and E. subsoiling was conducted to break a plow pan in summer: flat land parcels were subsoiled to 40 cm by a side-column subsoiler to break the plow pan.

Example 2

The conservation tillage with straw returning was described in this example:

After the crops were harvested in autumn, straws were timely raked and concentrated in rows. When there are too many straws, the straws should be packaged in proper quantity, but the straws are mainly returned to the field to increase an organic matter content in soil and improve fertility. In this example, subsoiling was conducted in autumn to increase a ground temperature during spring sowing in the next year. During the subsoiling in autumn, only the recreational belts for sowing in the next year were subsoiled, but the sowing belts in the next year cannot be subsoiled, so as not to affect a soil moisture content during the next spring sowing.

Example 3

A sowing time and a sowing method were described in this example:

Seeds were sown timely when the Grain Rain (a solar term) came. If straws are messed up by wind, a front-loaded returning device may be hung in front of a sowing machine for a second concentration. The grass-pull wheels of a no-tillage seeder were down-regulated by one level so that seeds would not be padded by stubbles and the like and the number of sown plants would not be affected, the surface dry soil could be peeled off to ensure a soil moisture content, and watering could also be facilitated when in the early spring.

When cultivated land is wind sandy land, the grass-pull wheels of the no-tillage seeder may be adjusted or not adjusted according to an actual situation.

In the case where a wide- and narrow-row mode is adopted for sowing. At an original ridge spacing of about 65 cm, a small row spacing is preferably adjusted to 42 cm to 45 cm, and a large row spacing should be ensured to be above 85 cm, thus facilitating subsoiling in summer and ensuring a bounding effect. Because an existing seeder can only apply a base fertilizer to about 8 cm, 500 kg of a 40% organic-inorganic mixed slow-release fertilizer is adopted as the base fertilizer to improve an organic matter content in soil and reduce a production cost. Moreover, 80 kg of a high-quality organic bacterial fertilizer is used as a seed fertilizer to ensure that seedlings on no-tillage land parcels show better growth than that on other land parcels.

Example 4

The selection and preparation of herbicides were described in this example:

Herbicides with guaranteed quality from regular manufacturers were selected. The use effect of an herbicide is closely related to temperature, humidity, sunlight, rainfall, spraying time, and soil properties. For pre-emergence weeding, the secondary dilution method is adopted, and an herbicide is prepared into a stock solution with warm water at 30° C. to 40° C. before use. The herbicide must not be directly mixed with cold water, so as not to affect the efficacy. An average temperature of about 12° C. is required. As the optimal spraying time, the herbicide needs to be sprayed before 10 am or after 4 pm to prevent direct sunlight from affecting a weeding effect. For post-emergence weeding, the secondary dilution method is also required, and the growth condition and type of weed are carefully observed to apply an herbicide according to specific conditions. The herbicide is sprayed on stems and leaves of weeds at a 3 to 4-leaf stage of maize. It should be ensured that there is no rain wash within 6 hours to 12 hours after the spraying, thus achieving the optimal effect.

In the secondary dilution method, an herbicide is dissolved in a small amount of water in a container to obtain a stock solution, then the stock solution is poured into a sprayer with a given amount of water, and a desired amount of water is added under stirring. An herbicide solution prepared according to the above method is uniform and easily absorbed by weeds, and thus can achieve an excellent weeding effect. If two or more herbicides are mixed, they should be diluted separately and then thoroughly mixed by stirring.

Example 5

The subsoiling at a seedling stage was described in this example:

The subsoiling, also called deep-tillage, refers to a farming technique where a subsoiler is pulled by a tractor to loosen soil, break a plow pan, improve the structure of a plough layer, and enhance the ability of soil to store water, retain a moisture content, resist drought, and drain stagnant water.

In this example, a root system can grow deeply into a water-retaining layer to resist drought in a drought year, and stagnant water can be drained in a flood year. During subsoiling in summer, 280 kg of a nitrogen-potassium fertilizer is additionally applied, ensuring that the fertilization is conducted at a depth close to 30 cm. With the fertilizer-tropism of plants, a plant root system is guided into a water-retaining layer through the three-layer fertilization, thus improving the ability of drought resistance and flood drainage. Therefore, the use of inorganic fertilizers is reduced, the additional application of organic fertilizers is increased, and the cost of food production is reduced.

The above shows and describes the basic principles, main features, and advantages of the present disclosure. It should be understood by those skilled in the art that, the present disclosure is not limited by the above examples, and the above examples and the description only illustrate the principle of the present disclosure. Various changes and modifications may be made to the present disclosure without departing from the spirit and scope of the present disclosure, and such changes and modifications all fall within the claimed scope of the present disclosure. The protection scope of the present disclosure is defined by the appended claims and equivalents thereof.

What is claimed is:

1. A method for maize cultivation in the black soil area of Northeast China, comprising the following steps that can be conducted in any order:
   conservation tillage with straw returning: after a crop is harvested in autumn, raking and concentrating straws in rows;
   when sowing, increasing the number of plants through a wide- and narrow-row effect;
   additional application of an organic bacterial fertilizer: wherein, the organic bacterial fertilizer comprises a base fertilizer and a seed fertilizer; the base fertilizer refers to 500 kg of a 40% organic-inorganic mixed slow-release fertilizer; and the seed fertilizer refers to 80 kg of an organic bacterial fertilizer;
   weeding with a herbicide treated by a secondary dilution method; and
   subsoiling to break a plow pan in summer: subsoiling flat land parcels to 40 cm by a side-column subsoiler to break the plow pan.

2. The maize cultivation method according to claim 1, wherein, the increasing the number of plants through a wide- and narrow-row effect specifically comprises: at an original ridge spacing of about 65 cm, adjusting a small row spacing to 42 cm to 45 cm, and adjusting a large row spacing to more than 85 cm.

3. The maize cultivation method according to claim 1, wherein, the herbicide is diluted by the secondary dilution method, and the herbicide is prepared into a stock solution with warm water at 30° C. to 40° C.

4. The maize cultivation method according to claim 3, wherein, a temperature of the stock solution is controlled at 12° C.

5. The maize cultivation method according to claim 1, wherein, the herbicide is sprayed on stems and leaves of weeds at a 3 to 4-leaf stage of maize.

6. The maize cultivation method according to claim 1, wherein, the weeding specifically comprises pre-emergence weeding and post-emergence weeding.

7. The maize cultivation method according to claim 1, wherein, when subsoiling, 280 kg of a nitrogen-potassium fertilizer is additionally applied at a depth controlled to 30 cm.

* * * * *